United States Patent [19]

Berge et al.

[11] Patent Number: 4,596,206

[45] Date of Patent: Jun. 24, 1986

[54] SEED TREATMENT APPARATUS

[75] Inventors: Thomas T. Berge; Stephen M. Sande, both of Grand Forks, N. Dak.

[73] Assignee: Agsco, Inc., Grand Forks, N. Dak.

[21] Appl. No.: 614,477

[22] Filed: May 29, 1984

[51] Int. Cl.⁴ .......................... B05C 5/00; B05B 17/00
[52] U.S. Cl. ..................................... 118/303; 427/212
[58] Field of Search ......................... 118/303; 427/212

[56] References Cited

U.S. PATENT DOCUMENTS

| 2,319,865 | 5/1943 | James | 118/303 |
| 3,605,688 | 9/1971 | Heden et al. | 118/303 |
| 3,912,231 | 10/1975 | Weber | 118/303 |
| 4,275,682 | 6/1981 | Weber | 118/303 |

FOREIGN PATENT DOCUMENTS

| 85149 | 8/1983 | European Pat. Off. | 118/303 |
| 663343 | 5/1979 | U.S.S.R. | 118/303 |

Primary Examiner—Shrive P. Beck
Attorney, Agent, or Firm—Robert E. Kleve

[57] ABSTRACT

The invention comprises an apparatus for treatment of seeds with liquid insecticide-fungicide and other materials. The apparatus has an opening at its upper end formed by a wall for receiving seeds for treatment with the liquid. A cone is mounted beneath the opening to deflect and spread the seed outward evenly about the cone as they travel down the outer surfaces of the cone. Adjustable plates are mounted in the opening to vary the size for matching the incoming flow to direct the seeds onto the center of the cone, the wall has circumferential overflow openings spaced above the lower edge of the wall. A lever is provided to raise and lower the cone with respect to the wall whereby the movement of the cone upward moves the cone sufficiently close to the wall so as to slow the amount of seeds traveling off the cone to allow the seeds to build up and constantly fill the annular space formed between the cone and wall with a constant overflow through the overflow openings. This enables a constant flow of seeds from all sides of the cone so as to form a vertical column of seeds for more even treatment with the liquid. A rotary applicator is rotatably mounted beneath the cone for applying the liquid to the seeds from inside the column of seeds formed after traveling off the cone.

1 Claim, 10 Drawing Figures

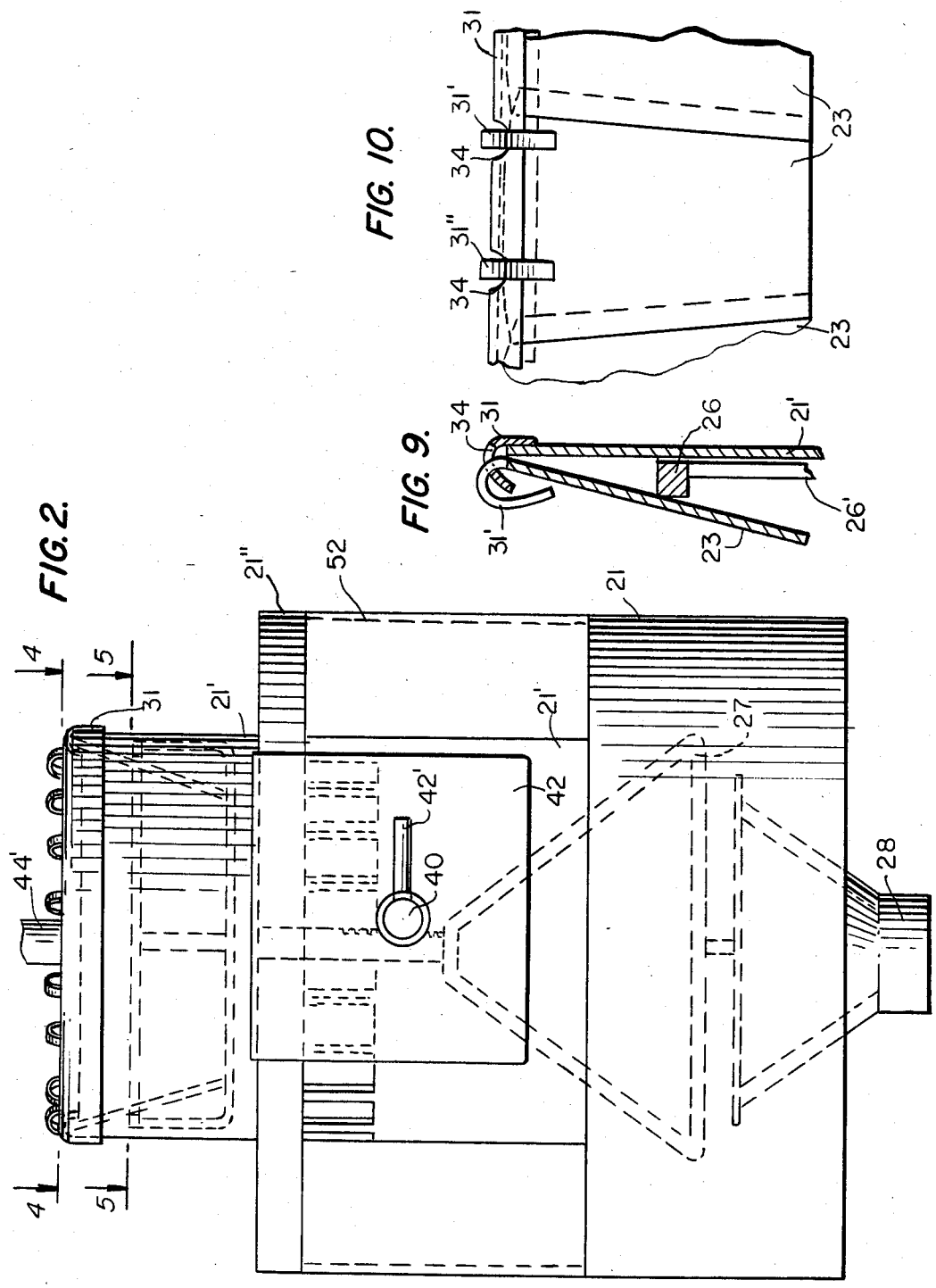

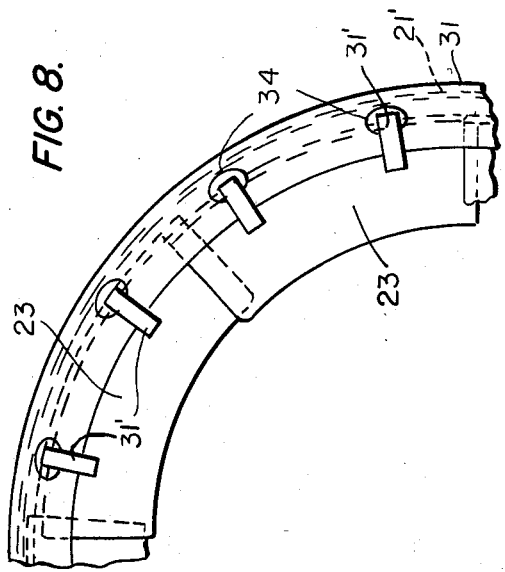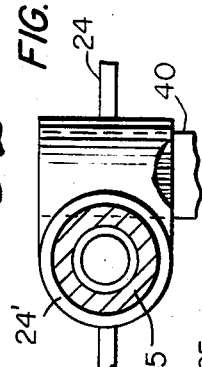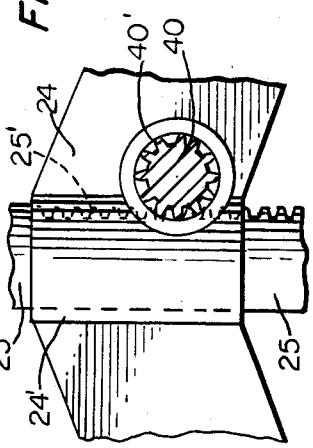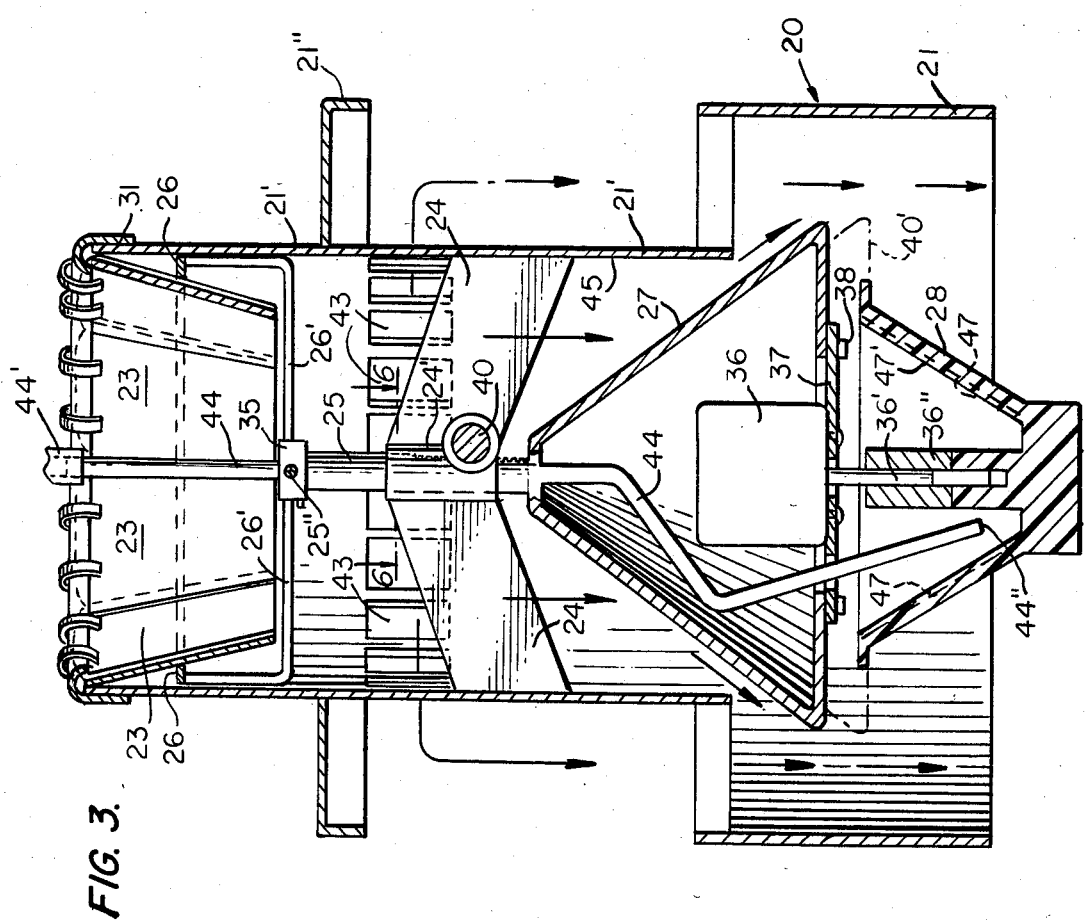

SEED TREATMENT APPARATUS

The invention relates to material treatment apparatus, more particularly, the invention relates to seed treatment apparatus.

It is an object of the invention to provide a novel seed treatment apparatus for applying liquid material in a spray form onto the seeds in a uniform manner.

It is another object of the invention to provide a novel seed treatment apparatus for treating seeds with insecticide-fungicide that spreads out the path of the seeds so that the seeds travel past the applicator in a substantially uniform amount on all sides with means to control the amount traveling past the applicator in an interval of time so as to increase the certainty that each of the seeds will receive the insecticide-fungicide from the applicator as they travel past and that the seeds will receive a substantially equal amount.

It is another object of the invention to provide a particle treatment apparatus for applying a fine spray of fluid onto the particles in a manner so as to more evenly apply it to all particles as they pass the device.

It is a further object of the invention to provide a novel particle treatment apparatus for more evenly and uniformally applying treatment material.

Further objects and advantages of the invention will become apparent as the description proceeds and when taken in conjunction with the accompanying drawing wherein:

FIG. 2 is an enlarged cutaway side elevational view of the invention illustrating the adjustable deflecting plates in the entry to the device and the adjustable cone and rotary applicator beneath the cone.

FIG. 3 is a similarly enlarged cutaway view of the metering or spraying insecticide-fungicide apparatus.

FIG. 6 is a cross-sectional view taken along line 6—6 of FIG. 3.

FIG. 7 is a cross-sectional view taken along line 7—7 of FIG. 6.

FIG. 8 is a fragmentary top plan view.

FIG. 9 is a cross-sectional view taken along line 9—9 of FIG. 4.

FIG. 10 is an enlarged fragmentary view of the plates.

Briefly stated, the invention comprises an apparatus for treatment of seeds with liquid insecticide-fungicide and other materials, said apparatus having an entry at its upper end formed by a cylindrical wall for receiving seeds therein under gravity flow to be treated with the liquid, a cone mounted beneath the opening to deflect and spread the seed outward, received through the opening, evenly about the cone as they travel down the outer surfaces of the cone, adjustable plates mounted in the opening to vary the size for matching the incoming flow to direct the seeds onto the center of the cone, said wall having circumferential overflow openings spaced above the lower edge of the wall, a lever to raise and lower the cone with respect to the wall to move the cone sufficiently close to the wall so as to slow or regulate the amount of seeds traveling off the cone to allow the seeds to build up and constantly fill the annular space formed between the cone and wall with a constant overflow of seeds through the overflow openings, which enables a constant flow of seeds from all sides of the cone so as to form a vertical column of seeds for more even treatment with the liquid, a rotary applicator rotatably mounted beneathe the cone for applying the liquid to the seeds from inside the column of seeds formed after traveling off the cone.

Figure 1:
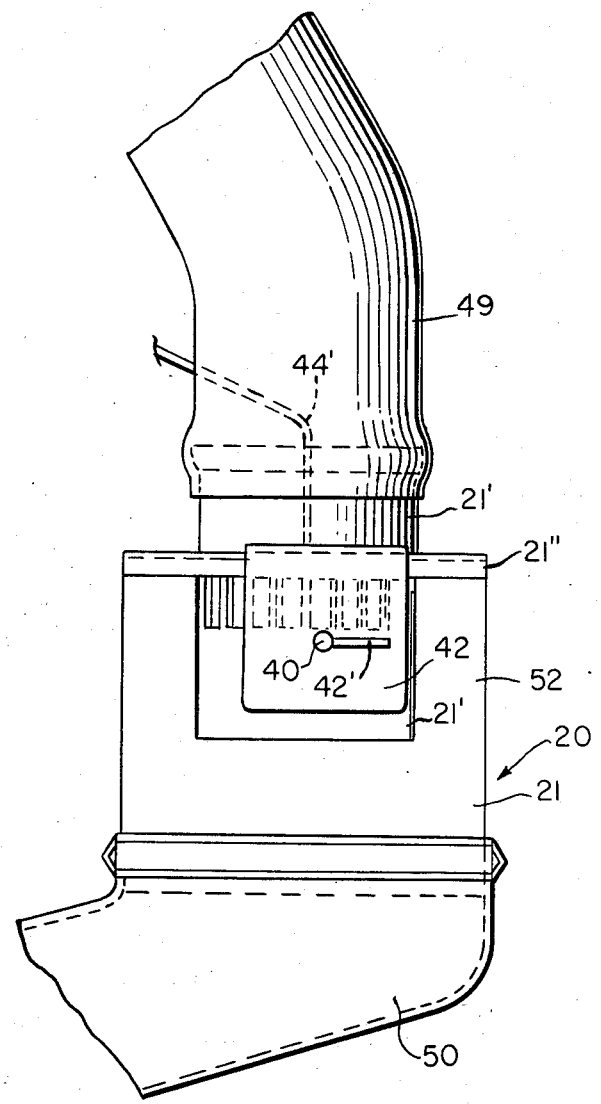
FIG. 1 is a side elevational view of the seed treatment apparatus operatively mounted in a conduit wherein seeds travel through the conduit, so that the device or apparatus is in the path of the seeds for applying insecticide-fungicide spray to the seeds as they pass through the apparatus.
Figure 5:
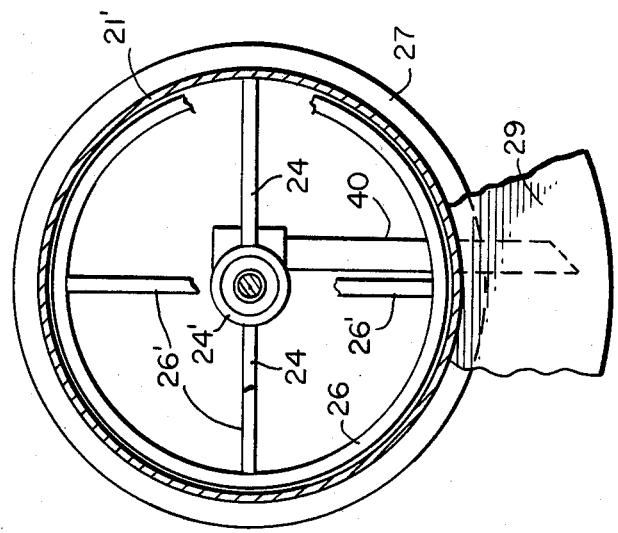
FIG. 5 is a cross-sectional view taken along line 5—5 of FIG. 2.
Figure 4:
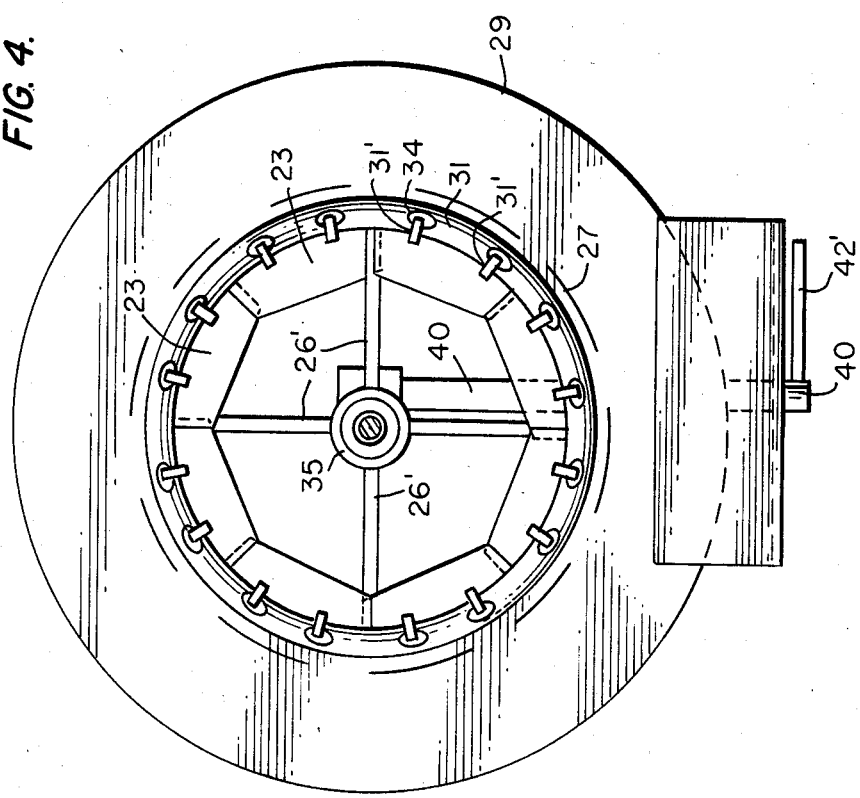
FIG. 4 is a top plan view of the apparatus taken along line 4—4 of FIG. 2.

Referring more particularly to the drawings, in FIG. 1 the seed treatment apparatus 20 is illustrated as having an enlarged cylindrical wall portion. A reduced cylindrical wall portion 21' is fixed within the enlarged cylindrical wall 21 by bracing 21'''. A plurality of pivotally mounted plates 23 are pivotally mounted to the upper end of the reduced cylindrical wall 21'. A brace 24 is fixed across the wall 21' with a sleeve 24' fixed in the center of the brace. A ring 26 is fixed to the top of a shaft 25, and a cone 27 is fixed to the bottom of the shaft 25. The shaft 25 is slidable vertically within the sleeve 24' of the brace. A rotary applicator 28 is rotatably mounted to the cone 27. A disc-like top 29 is mounted to the reduced wall 21' and extends outwardly therefrom with a narrow enlarged cylindrical wall portion 30 extendin downward from the disc 30.

The reduced wall 21' has an annular cap 31 frictionally fit over the top of the wall 21'. The plates 23 are pivotally mounted to the cap 31 of the reduced wall 21' by each plate having a pair of straps 31' and 31'' which extend through openings 34 in the cap and curve downward to form loops for pivotally supporting the plates to the cylindrical wall and cap.

The ring 26 has cross braces 26' fixed thereto, with a collar 35 fixed to the center of the cross braces. The collar 35 is fixed to the shaft 25 to fix the ring to the shaft 25. The ring 26 is movable upward and downward with the cone 27 by the shaft 25. When the ring is moved upward by the shaft it engages the plates 23 along their outer surfaces 23' to pivot the lower ends of the plates toward one another and thereby reduce the size of the opening formed by the plates and thereby direct the seed entering the apparatus more onto the center of the cone 27. The ring when moved downward moves away from the plates allows the plates to pivot away from one another, by pivoting more toward vertical, due to gravity, and thereby increasin the size of the opening. The plate adjustment is for the purpose of matching the amount of seed coming in from an auger, for example, in an effort to direct the flow of seed onto the center of the cone 27. The more seed that comes in, in an interval of time, the larger the opening should be and the less coming in, the smaller the opening should be.

The cone 27, fixed to the shaft 25, is positioned beneath the ring and plates. The cone 27 has a motor 36 mounted inside. The motor 36 is bolted to a plate 37 and the plate 37 is bolted to the cone by bolts 38. The rotary applicator or rotary treatment dispensing cone 28 is fixed to a shaft extension 36'' and the shaft extension is fixed to the shaft 36' of the motor so that the cone is rotated when the motor is activated to rotate its shaft. Shaft 36' extends through opening 37' in plate 37.

A second shaft 40 is rotatably mounted in a bearing in the brace brace 24 to rotate perpendicular to the shaft 25 to move the shaft 25 up and down and thereby serve as a control shaft. The shaft 25 has teeth 25' running in a straight line parallel to its longitudinal axis. The control shaft 40 has teeth 40' running circumferentially about its longitudinal axis to engage the teeth 25' whereby rotation of the shaft 40 in one direction causes the teeth 40' to engage the teeth 25' to move the teeth 25' and the shaft 25 in a straight line upward in the sleeve 24'. The rotation of the control shaft 40 in the othe direction counterclockwise then viewed from FIG. 2, causes the teeth 40' to engage the teeth 25' of the shaft 25 and move the shaft 25 downward in the sleeve 24', thereby lowering the shaft 25, cone 27, and ring 26. A lever 42 is fixed to the outer end of the shaft 40 to rotate the shaft 40 by hand. The shaft 40 has enough frictional drag to maintain the shaft 40 and shaft 25 in their adjusted position.

A plate 42 is fixed to the front of the device 20 and measurements can be placed on the plate around the axis of the shaft 40 to indicate the location of the lever 42 for adjusting the location of the ring 26, cone 27, and cone applicator 28.

The reduced wall 21' has a plurality of windows or openings 43'. The shaft 25 is formed integrally with the cone 27 and extends up from the top of the cone. The ring 25 is adjustably fixed to the top of the shaft 25 by a set screw 25". The shaft 25 is hollow and the cone 27 has an opening in the top to enable a pipe 44 to extend down through the shaft 25 and through the opening in the cone 27 into the hollow interior 27" of the cone.

The pipe or tube 44, fitted into the inside of the shaft 25, extends vertically down the shaft 25 through an opening 46 in the plate 37 at the bottom of cone 27 into cone 28 with the open lower end 44" of the pipe positioned in spaced relation to the cone 28 near the bottom of the cone 28.

The raising of the shaft 25, by rotation of the control shaft 40 raises the ring 26 and causes the ring 26 to engage the outside of the plates 23 to pivot the plates inwardly toward one another and thereby reduce the circumference of the entry or opening and thereby direct and restrict the seeds more onto the center of the cone 27.

Also, raising the shaft 25 also raises the cone 27 and moves the cone 27 closer to the lower edge of the reduced cylindrical wall 21' thereby reducing the amount of annular space between the cone 27 and the cylindrical wall 21' so that less seed can travel out from between the cone and the wall and along the outside of the cone for treatment by the rotary cone applicator 28. This allows the seeds to build up in the annular space formed between the cone and wall.

Also, the plurality of openings or windows 43 cut in the wall about its circumference serve so that if there is an excess of seeds building up in the annular space between the inside of the cylindrical wall 21' and the cone 27, it can overflow through the openings 43.

In operation, the apparatus is for the treatment of the seeds normally with a liquid that is a combination insecticide-fungicide although the apparatus may be used to treat seeds with other materials.

In operation, the plates 23 act to guide the seeds as they enter the apparatus so that the seeds are distributed substantially equal in number and spacing about the cone 27, as they travel down the outside surface of the cone, o that an equal amount of seeds travel off the bottom edge 40 of the cone substantially at all points on the cone about 360 degrees.

To assure a constant even flow of seeds out the bottom of the cone with substantial uniformity from all sides of the cone, for more even treatment of the seeds with the liquid, the annular space must be constantly more than filled. It must be more than filled to a point of a constant overflow of seeds through the windows 43.

Thus, in the operation, the ring 26 and cone 27 will be adjusted so that there is more than enough seed or grain coming in to fill the annular gap or space between the inside portion 45 of the cylindrical wall 21' and the outside surface 27' of the cone 27 at all times so as to result in a constant overflow of seed through the windows, although most of the grain or seed will be coming out between the inside 45 and the cone 27, and only a minority of the seed or grain will be coming out through the overflow windows. Since if the gap is more than filled to the point of an overflow, a substantially uniform flow of seeds out all points about 360 from the bottom of the cone can be maintained, if the device is reasonably vertical.

A constant overflow is necessary, since if there is an open portion in the annular space that is not filled because not enough seeds or grain is comming into the annular space or because the apparatus is not sufficiently vertical, then the seeds or grain will tend to run to the low spot and not run out the higher spot in the annular space at all.

The grain or seeds after dropping off the bottom of the cone form a vertical column of grain or seeds, due to gravity, that travels past the applicator on all sides about 360 degrees, since the seeds are coming off the cone 27 with substantial uniformity and evenness from all sides.

Liquid insecticide-fungicide combination is fed into the pipe 44 of the apparatus 20 from an extension 44'; and travels down the pipe 44 and out the opening 44" in the bottom of the pipe where it drops onto the inside ribs 47 and channels of the cone 28. The rotation of the cone 28 causes the liquid to travel upward due to centrifical force, along the channels and along the flat surfaces 47' of the ribs and spray out radially and horizontally in 360 degrees onto the vertical column of seeds from inside the column of seeds traveling past.

The dispensing cone ribs 47 of the cone shaped applicator 28 have flat surfaces 47' directed in the direction of rotation (clockwise when viewed from FIG. 4) to cause the liquid insecticide combination to travel up the channels between the ribs and along the flat surfaces when the cone is rotated in a clockwise direction. The cone 28 is of conventional construction for dispensing liquid by centrifical force, which construction is already known in the art.

The overflow of seeds through the windows 43 will also drop down substantial uniformity about 360 degrees about the applicator, and receive the liquid insecticide-fungicide spray with substantial uniformity as the overflow of grain or seeds travels past.

If the device isn't entirely vertical, that part of the seeds coming through the overflow windows may not be dropping down with as much uniformity. However, that part of the seeds coming down from between the cone and the reduced cylindrical wall will still be substantially uniform in number and spacing about all sides, if the device is reasonably vertical; and since most of the grain or seeds will be coming out from between the cone and the cylindrical wall, most of the seeds will receive substantially uniform treatment.

The apparatus is operatively positioned between the outlet of a grain auger and an inlet to a grain drill, with the auger feeding grain from a receptacle such as a grain bin, truck box or other storage. The apparatus is mounted to the auger by mounting a flexible rubber sleeve 49 on the outlet of the aguer and mounting the other end of the sleeve onto the entry cylindrical wall 21' of the apparatus. The tubular extension 44' feeding the liquid will pass through an opening in the sleeve.

A receptacle 50 is mounted to the enlarged cyindrical wall portion 21 of the apparatus to receive the grain, after it has been treated with the liquid by traveling through the apparatus, and the receptacle 50 may be connected to a conduito guide the seed after treatment into the grain drill.

A plastic wall 52 of transparent material may be mounted about the outer cylindrical wall 21 and 21" by screws or other suitable mounting means to enclose the inner reduced cylindrical wall portion and thereby enclose the operation of the apparatus, in a manner so that the operator may see the overflow through the transparent wall 52.

It will be obvious that various changes and departures may be made to the invention without departing from the spirit and scope thereof, and accordingly, it is not intended that the invention be limited to that as specifically described in the specification or as illustrated in the drawings but only as set forth in the appended claims wherein:

1. A seed treatment apparatus comprising a container, an opening at its upper end to receive seed for treatment, a cone beneath said opening having a reduced top portion and an enlarged bottom portion with the outside surfaces therebetween forming a cone like surface, adjustable plate means in said opening to circumferentially vary the size of the opening to align the travel of the seeds so that they engage the cone centrally at the top, a rotatable liquid treatment applicator rotatably mounted to the bottom of the cone, motor means to rotate the applicator relative to the cone, a cylindrical wall surrounding said cone and said opening, said cylindrical wall having at least one opening about its circumference spaced above the bottom of said cone with its lower edge spaced adjacent said bottom of said cone to form an annular opening therebetween, said container being adapted to be mounted to an auger conveying a continuous stream of seeds into the opening, whereby said seeds will travel down the opening centrally onto the reduced upper end of the cone and spread out on all sides of the cone in the annular space between the cone and wall and travel out the annular opening, means to adjust said cone relative to said wall to vary the size of the annular opening between the cone and the bottom of the wall and vary the size of the annular space therebetween so that said annular space will be constantly filled with seeds to a point of overflow through said wall opening, in relation to the amount of seeds entering into the container, so that the annular space will remain constantly filled while seeds are traveling out the opening at the bottom of the space to assure that the seeds come out the opening with substantial uniformity evenness in number and spacing on all sides of the cone when traveling off the bottom of said cone, said seeds when traveling off the bottom of said cone forming a vertical column like stream of seeds, said rotatable applicator being rotatably mounted beneath the enlarged bottom of said cone acting to spray liquid seed treatment material radially outward from beneath the cone onto the seeds from the inside of said vertical column of seeds traveling down off the cone.

* * * * *